US010710601B2

(12) United States Patent
Sato et al.

(10) Patent No.: US 10,710,601 B2
(45) Date of Patent: Jul. 14, 2020

(54) TRAVEL CONTROL METHOD AND TRAVEL CONTROL DEVICE

(71) Applicant: Nissan Motor Co., Ltd., Yokohama-shi, Kanagawa (JP)

(72) Inventors: Ko Sato, Kanagawa (JP); Masahiro Kobayashi, Kanagawa (JP); Yasuhisa Taira, Kanagawa (JP); Osamu Fukata, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/315,267

(22) PCT Filed: Jun. 6, 2017

(86) PCT No.: PCT/JP2017/020918

§ 371 (c)(1),
(2) Date: Jan. 4, 2019

(87) PCT Pub. No.: WO2018/008316

PCT Pub. Date: Jan. 11, 2018

(65) Prior Publication Data

US 2019/0308631 A1 Oct. 10, 2019

(30) Foreign Application Priority Data

Jul. 5, 2016 (JP) ................................ 2016-133219

(51) Int. Cl.
*B60W 50/00* (2006.01)
*B60W 10/20* (2006.01)
(Continued)

(52) U.S. Cl.
CPC ........ *B60W 50/0098* (2013.01); *B60W 10/20* (2013.01); *B60W 30/12* (2013.01);
(Continued)

(58) Field of Classification Search
CPC .......... B60W 50/0098; B60W 30/182; B60W 30/12; B60W 10/20; B60W 2540/215;
(Continued)

(56) References Cited

U.S. PATENT DOCUMENTS 4,361,202 A * 11/1982 Minovitch ......... B60K 31/0008 104/88.02
8,457,868 B2 6/2013 Tange et al.
(Continued)

FOREIGN PATENT DOCUMENTS

JP 2001039325 A 2/2001
JP 3912279 B2 5/2007
(Continued)

*Primary Examiner* — Russell Frejd
(74) *Attorney, Agent, or Firm* — Young Basile Hanlon & MacFarlane, P.C.

(57) ABSTRACT

A travel control method controls travel of an own vehicle to locate a lateral position of the own vehicle at a predetermined position with respect to a lane marker of a lane in which the own vehicle is traveling or with respect to a preceding vehicle, and reduces a control amount on travel from when control on the travel of the own vehicle is started until a predetermined time passes to be smaller than a control amount on the travel after the predetermined time has passed.

3 Claims, 3 Drawing Sheets

FROM S05
S701
IS SWITCH OFF→ON?
NO
YES
S703
IS VEHICLE DEVIATED FROM LANE?
YES
S704
NORMAL CONTROL
NO
MODERATE CONTROL
S705
S707
HAS PREDETERMINED TIME PASSED?
NO
NORMAL CONTROL
S711
TO S13

(51) Int. Cl.

| | |
|---|---|
| ***B60W 30/12*** | (2020.01) |
| ***B60W 30/182*** | (2020.01) |
| ***B62D 15/02*** | (2006.01) |
| ***B62D 6/00*** | (2006.01) |
| ***G05D 1/02*** | (2020.01) |
| ***G05D 1/00*** | (2006.01) |
| ***B60W 30/16*** | (2020.01) |
| ***B60W 40/10*** | (2012.01) |
| ***B60W 50/08*** | (2020.01) |

(52) U.S. Cl.
CPC .......... *B60W 30/16* (2013.01); *B60W 30/182* (2013.01); *B60W 40/10* (2013.01); *B60W 50/082* (2013.01); *B62D 6/00* (2013.01); *B62D 15/021* (2013.01); *G05D 1/0061* (2013.01); *G05D 1/021* (2013.01); *B60W 2050/007* (2013.01); *B60W 2050/0024* (2013.01); *B60W 2540/215* (2020.02); *G05D 2201/0213* (2013.01)

(58) Field of Classification Search
CPC ... B60W 2050/0024; B60W 2050/007; B60W 50/082; B60W 40/10; B60W 30/16; B62D 6/00; B62D 15/021; G05D 2201/0213; G05D 1/021; G05D 1/0061
See application file for complete search history.

(56) References Cited

U.S. PATENT DOCUMENTS

| | | | | | |
|---|---|---|---|---|---|
| 2011/0015850 | A1* | 1/2011 | Tange | B60W 30/12 | 701/116 |
| 2012/0239255 | A1* | 9/2012 | Kojima | B60T 8/17557 | 701/42 |

FOREIGN PATENT DOCUMENTS

| | | | |
|---|---|---|---|
| JP | 2009234560 | A | 10/2009 |
| JP | 2011116288 | A | 6/2011 |
| JP | 2013180638 | A | 9/2013 |
| JP | 2017177944 | A | 10/2017 |
| KR | 100857331 | B1 | 9/2008 |

* cited by examiner 1
19
DRIVING ASSIST CONTROLLER
100
TRAVEL CONTROL DEVICE
110
SWITCH-STATE DETECTION UNIT
120
LANE-MARKER RECOGNITION UNIT
130
VEHICLE CONTROL UNIT
3
VEHICLE DRIVE CONTROLLER
5
ENGINE CONTROLLER
7
FORWARD CAMERA
9
COMMUNICATION UNIT
11
GPS RECEIVER
15
FORWARD RADAR
17
VEHICLE SPEED SENSOR
18
DRIVING-ASSIST CHANGEOVER SWITCH
DISPLAY
21
SPEAKER
23
STEERING ACTUATOR
25

TRAVEL CONTROL METHOD AND TRAVEL CONTROL DEVICE

CROSS REFERENCE TO RELATED APPLICATION

The present application claims priority to Japanese Patent Application No. 2016-133219, filed Jul. 5, 2016, incorporated herein in its entirety.

TECHNICAL FIELD

The present invention relates to a travel control method and a travel control device.

BACKGROUND

Conventionally, a device that performs automatic steering of applying steering torque and the like to a steering-force transmission system to cause an own vehicle to follow a lane in front of the vehicle is known (see Japanese Patent Laid-Open Publication No. 2001-039325).

However, if a normal control amount is applied to a steering-force transmission system immediately after switching from manual steering to automatic steering, a problem occurs that steering control is abruptly started, which provides a discomfort feeling to a driver.

SUMMARY

The present invention has been made in view of the above problem and it is an object of the present invention to provide a travel control method and a travel control device that reduce a discomfort feeling provided to a driver when control of a lateral position of a vehicle is started.

A travel control method according to an aspect of the present invention is a method of a travel control device that can switch between an automatic driving mode in which travel of an own vehicle is controlled to locate a lateral position of the own vehicle at a predetermined position with respect to a lane marker of a lane in which the own vehicle is traveling or with respect to a preceding vehicle traveling ahead of the own vehicle in the lane and a manual driving mode in which travel of the own vehicle is not controlled, the method comprising when switching from the manual driving mode to the automatic driving mode is performed, calculating a steering-angle target value required to locate the lateral position of the own vehicle with respect to the lane marker at a predetermined position, computing a steering-torque target value required to cause an actual steering angle to match the steering-angle target value, adjusting a gain by which the steering-angle target value adjusting a gain by which the steering-torque target value is to be multiplied, to adjust an actual steering torque, and increasing the gain according to an elapsed time from switching to the automatic driving mode.

According to the present invention, it is possible to provide a travel control method and a travel control device that reduce a discomfort feeling provided to a driver when control of a lateral position of a vehicle is started.

DETAILED DESCRIPTION

Figure 1:
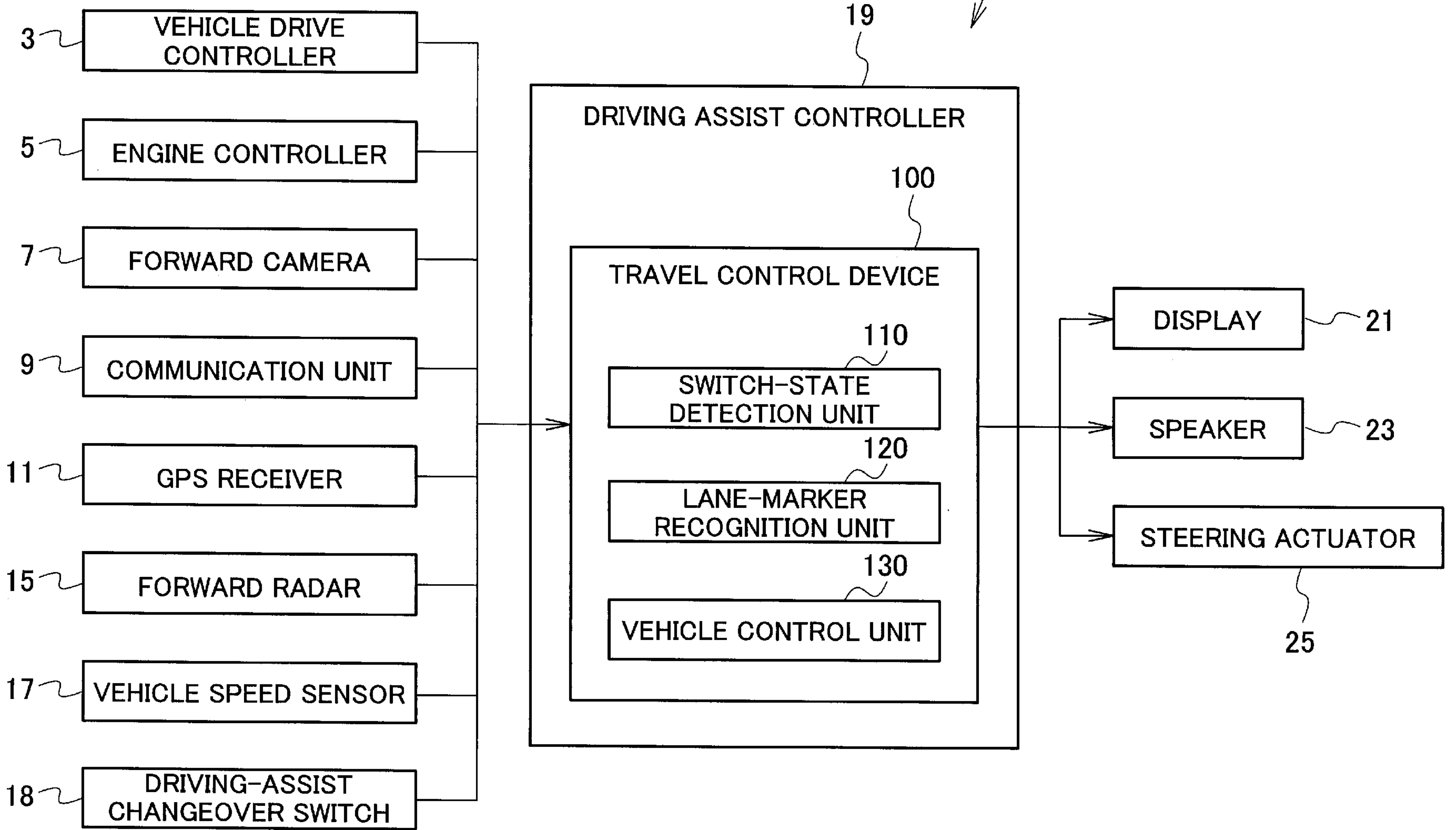
FIG. 1 is a block diagram illustrating a configuration of a travel control system 1 according to an embodiment of the present invention.

An embodiment of the present invention will be described below with reference to the drawings. In the descriptions of the drawings, like parts are denoted by like reference signs and redundant explanations thereof will be omitted.

A configuration of a travel control system 1 according to an embodiment of the present invention is described with reference to FIG. 1. The travel control system 1 includes a vehicle drive controller 3, an engine controller 5, a forward camera 7, a communication unit 9, a GPS receiver 11, a forward radar 15, a vehicle speed sensor 17, and a driving-assist changeover switch 18. The travel control system 1 also includes a driving assist controller 19, a display 21, a speaker 23, and a steering actuator 25. The travel control system 1 is mounted on an own vehicle and the own vehicle is provided with a system, such as an adaptive cruise control, that enables following travel with respect to a preceding vehicle ahead of the own vehicle.

The vehicle drive controller 3 includes a system that controls drive of a vehicle, such as an anti-lock braking system, a traction control system, or a vehicle dynamics control. The engine controller 5 is a controller that controls an engine. The forward camera 7 takes an image in front of the own vehicle to acquire an image including an image of a preceding vehicle. The image taken by the forward camera 7 is used to acquire information, such as an inter-vehicle distance or a relative speed to a preceding vehicle or a lateral position of the preceding vehicle with respect to the own vehicle or lane markers. The communication unit 9 performs transmission or reception of information communication service using road-to-vehicle communication or a mobile phone line. The GPS receiver 11 receives information of the latitude, longitude, and height of the own vehicle from satellites. The forward radar 15 measures an inter-vehicle distance or a relative speed between a preceding vehicle and the own vehicle using a millimeter wave. The vehicle speed sensor 17 measures a vehicle speed of the own vehicle. The driving-assist changeover switch 18 is a switch for switching between an automatic driving mode in which travel of the own vehicle is controlled to locate the own vehicle at a predetermined position with respect to lane markers of a lane in which the own vehicle is traveling or with respect to a preceding vehicle traveling ahead of the own vehicle in the lane, and a manual driving mode in which travel of the own vehicle is not controlled, and the driving-assist changeover switch 18 is operated by the driver of the own vehicle.

The driving assist controller 19 controls a driving assist system or an automatic driving system, such as the adaptive cruise control, an emergency brake, or an auto-hold brake. A system that has a steering control function added to the adaptive cruise control can be further included therein. The driving assist controller 19 detects whether there is a preceding vehicle or lane markers (lane detection) using the forward camera 7 or the forward radar 15, measures an inter-vehicle distance and a lateral position of the preceding vehicle with respect to the own vehicle or the lane markers, and transmits a command to the engine controller 5 or the steering actuator 25 to perform acceleration/deceleration of the own vehicle or to execute steering control. The driving assist controller 19 executes vehicle speed control to cause the own vehicle to travel while keeping a constant vehicle speed when there is no preceding vehicle, and executes inter-vehicle-distance maintaining control to cause the own vehicle to travel while keeping a constant inter-vehicle distance to a preceding vehicle when there is a preceding vehicle. When a preceding vehicle stops, the own vehicle is also stopped to execute stop hold control.

The display 21 displays the state of the system such as the adaptive cruise control, the emergency brake, or the auto-hold brake. When there is presentation of information or an alarm from the adaptive cruise control, the emergency brake, the auto-hold brake, or the like, the speaker 23 outputs sound as well as displaying. The steering actuator 25 performs a steering operation for lateral position control on the own vehicle upon receipt of an instruction from the driving assist controller 19 and a travel control device 100.

The travel control device 100 is mounted on the own vehicle as a controller integrated with the driving assist controller 19. The travel control device 100 controls travel of the own vehicle to locate the own vehicle at a predetermined position with respect to lane markers of a lane in which the own vehicle is traveling or a preceding vehicle (for example, a central position between right and left lane markers or the same position as the traveling path of the preceding vehicle). Specifically, the travel control device 100 controls at least one of steering or braking of the vehicle to locate the lateral position of the own vehicle at a predetermined position with respect to lane markers of the lane or the traveling path of a preceding vehicle. A case where travel of the own vehicle is controlled to locate the own vehicle at a predetermined position with respect to lane markers of the lane is cited below as an example. The following descriptions explain a case where the travel control device 100 transmits a control signal to the steering actuator 25 to control steering of a vehicle as an example.

The travel control device 100 can switch between the automatic driving mode in which travel of the own vehicle is controlled and the manual driving mode in which travel of the own vehicle is not controlled. The travel control device 100 switches between the automatic driving mode and the manual driving mode each time the switch 18 is operated. The trigger of switching is not limited to the operation of the switch 18. For example, when the driver intervenes automatic driving in the automatic driving mode, the travel control device 100 temporarily switches the driving mode to the manual driving mode. When the intervention of the driver thereafter ends, the control on travel by the travel control device 100 is restarted after a predetermined time has passed. That is, the travel control device 100 switches from the manual driving mode to the automatic driving mode without an operation of the switch 18.

The travel control device 100 is, for example, a general-purpose microcomputer including a CPU (central processing unit), a memory, and an input/output unit. A computer program (a travel control program) for causing a microcomputer to function as the travel control device 100 is installed on the microcomputer and is executed. This enables a general-purpose microcomputer to function as the travel control device 100. While an example in which the travel control device 100 is realized by software is described below, it is of course possible to prepare hardware dedicated to performing each information processing described below to configure the travel control device 100. A plurality of units (110, 120, and 130) included in the travel control device 100 can be configured of respective pieces of hardware. As well as the travel control device 100, each of the vehicle drive controller 3, the engine controller 5, and the driving assist controller 19 also can be realized as software or dedicated hardware similarly. The travel control device 100 can double as an electron control unit (ECU) to be used for other control related to the vehicle.

The travel control device 100 includes a switch-state detection unit 110, a lane-marker recognition unit 120, and a vehicle control unit 130 as functional constituent elements. The switch-state detection unit 110 detects the state of the driving-assist changeover switch 18 in real time. The lane-marker recognition unit 120 recognizes lane markers that mark off a lane (an own lane) in which the own vehicle travels from an image acquired by the camera 7. The vehicle control unit 130 controls travel of the own vehicle, for example, steering of the own vehicle to locate the lateral position of the own vehicle at a predetermined position with respect to the lane markers recognized by the lane-marker recognition unit 120. Specifically, the vehicle control unit 130 transmits a control signal to the steering actuator 25 to control steering torque output from the steering actuator (motor) 25. In this way, the travel control device 100 can control steering of the vehicle.

When the automatic driving mode is selected, the vehicle control unit 130 calculates a target value of a steering angle necessary to locate the lateral position of the own vehicle at a predetermined position with respect to the lane markers on the basis of travel state information of the own vehicle. The vehicle control unit 130 computes a target value of steering torque necessary to match an actual steering angle with the target value of the steering angle. The vehicle control unit 130 adjusts a gain value by which the target value of the steering torque is to be multiplied, to adjust the steering torque to be actually output by the steering actuator 25. That is, the vehicle control unit 130 adjusts the ratio of the actual steering torque to the target value of the steering torque using the gain value. As the gain value is increased, the actual steering torque approaches the target value of the steering torque and the steering control amount is increased. Accordingly, as the gain value is set to a larger value, more abrupt steering control is executed and the lateral position of the own vehicle can be moved to the predetermined position in a shorter time.

When the driving mode is switched from the manual driving mode to the automatic driving mode, the vehicle control unit 130 changes the gain value according to the time elapsed after the switching is performed and control on travel of the own vehicle is started, thereby changing the control amount on steering. Specifically, the vehicle control unit 130 reduces the gain value from when switching from the manual driving mode to the automatic driving mode is performed and control on travel of the own vehicle is started until a predetermined time passes, to be smaller than the gain value after the predetermined time has passed. Accordingly, the control amount on steering from when switching from the manual driving mode to the automatic driving mode is performed and control on travel of the own vehicle is started until a predetermined time passes can be set to be smaller than the control amount on steering after the predetermined time has passed. When the control amount on steering after the predetermined time has passed is assumed as "normal control amount", the control amount on steering from when switching from the manual driving mode to the automatic driving mode is performed and control on travel of the own vehicle is started until a predetermined time passes is "moderate control amount".

This prevents the normal control amount from being applied to travel of a vehicle immediately after start of lane keeping control or immediately after restart thereof and suppresses abrupt start of travel control. Therefore, a discomfort feeling provided to the driver can be reduced. Specifically, a lateral position with respect to lane markers where a driver can easily drive a vehicle differs according to the driver. Therefore, if the vehicle is abruptly controlled from an easily-to-drive lateral position to a predetermined position (a lane central position, for example) at the time of start of lane keeping control, the driver may feel a great discomfort. Therefore, the lateral position is changed gradually at the time of start of the control, which can reduce the discomfort. The "moderate control amount" does not include the control amount being zero. That is, the control on travel is executed with the "moderate control amount" not being zero without delaying start of control on travel by the travel control device 100 from when switching from the manual driving mode to the automatic driving mode is performed until a predetermined time passes.

When the driving mode is switched from the manual driving mode to the automatic driving mode, the vehicle control unit 130 determines on the basis of the travel state information of the own vehicle whether the own vehicle deviates from the lane if the current traveling state of the own vehicle is maintained. That is, the vehicle control unit 130 determines whether an expected travel pathway of the own vehicle, which is assumed from the steering state or the yaw rate of the own vehicle, runs outward from a pair of right and left lane markers recognized by the lane-marker recognition unit 120. When determining that the own vehicle deviates from the lane, the vehicle control unit 130 executes control of steering required to prevent the own vehicle from deviating from the lane with the "normal control amount". After the control of steering required to prevent the own vehicle from deviating from the lane is executed, the control amount on steering is set to the "moderate control amount". In other words, the control amount required to prevent the own vehicle from deviating from the lane in the control amount on steering from when switching from the manual driving mode to the automatic driving mode is performed until a predetermined time passes is set to be larger than the subsequent control amount on steering.

Accordingly, it is possible to set the control amount on steering for preventing deviation from the lane to a large value and to reduce the subsequent control amount on steering. Therefore, a discomfort feeling provided to a driver can be decreased while deviation from the lane is prevented.

Figure 2:
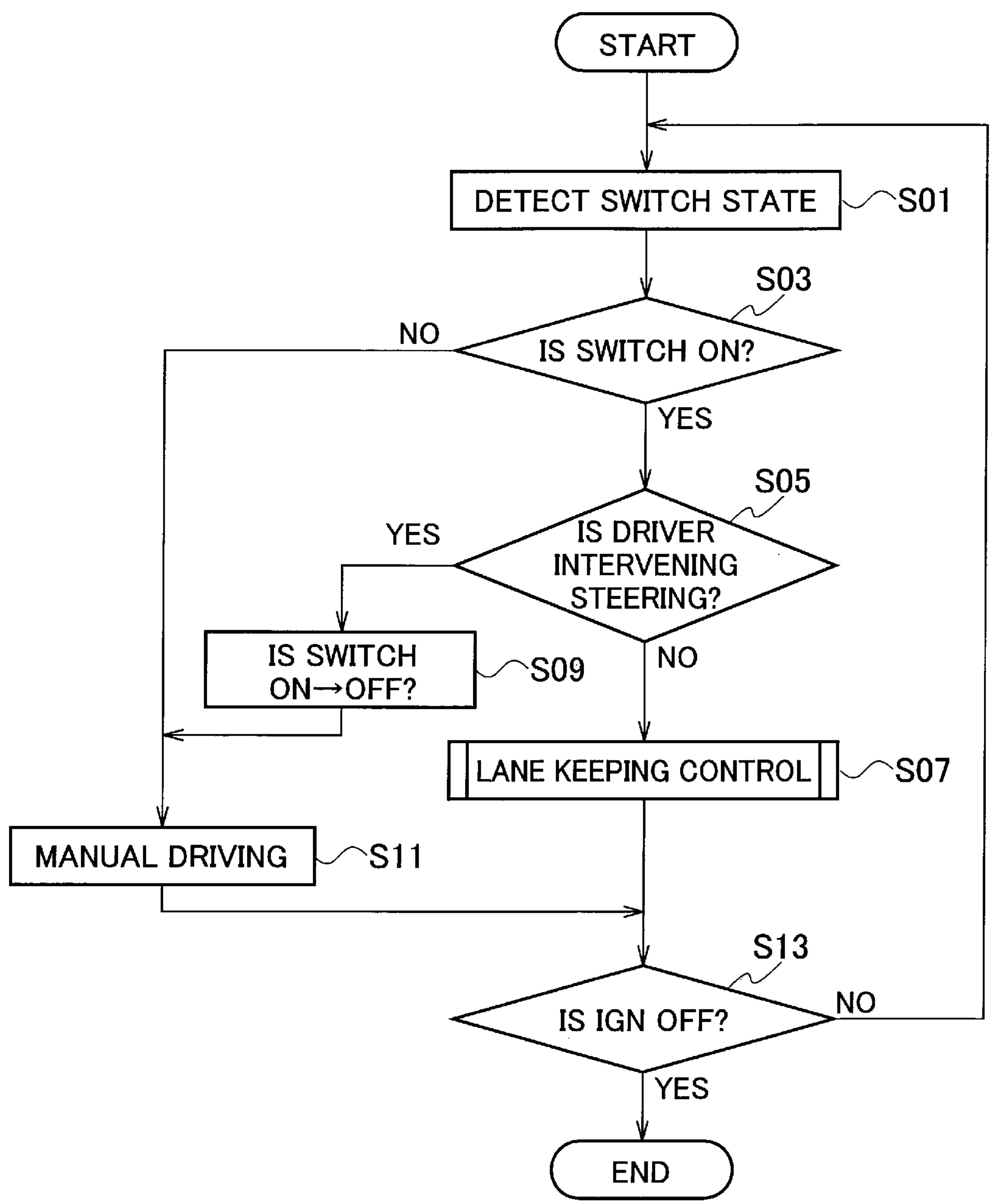
FIG. 2 is a flowchart illustrating an example of a processing operation of a travel control device 100 in FIG. 1.

An example of a travel control method using the travel control device 100 illustrated in FIG. 1 is described with reference to FIG. 2. A flowchart of FIG. 2 is started by turning on an ignition switch (IGN) included in the own vehicle and is repeatedly performed until the ignition switch (IGN) is turned off.

At Step S01, the switch-state detection unit 110 detects the state of the driving-assist changeover switch 18. When the state of the switch 18 is an on-state (YES at Step S03), it is determined that an automatic driving mode is selected and the process proceeds to Step S05. On the other hand, when the state of the switch 18 is an off-state (NO at Step S03), it is determined that a manual driving mode is selected, the travel control device 100 then performs the manual driving mode (Step S11), and the process proceeds to Step S13.

At Step S05, the travel control device 100 determines whether a driver is intervening steering. When it is determined that the driver is intervening steering (YES at Step S05), the travel control device 100 determines that the driver does not intend to continue the automatic driving mode and switches the driving-assist changeover switch 18 from the on-state to the off-state. The manual driving mode is thereby performed (Step S11). Although not illustrated, the process includes a flow of automatically returning from the manual driving mode to the automatic driving mode when the driver ends intervention in travel control.

On the other hand, when it is determined that the driver is not intervening steering (NO at Step S05), the process proceeds to Step S07 and the travel control device 100 executes lane keeping control. That is, the travel control device 100 recognizes a lane in which the own vehicle is traveling and controls travel of the own vehicle to locate the own vehicle at a predetermined position with respect to lane markers of the lane. Details of the lane keeping control will be described later with reference to FIG. 3.

At Step S13, whether the ignition switch (IGN) is in an off-state is determined. The process returns to Step S01 when the ignition switch (IGN) is in an on-state (NO at Step S13), and the flow illustrated in FIG. 2 ends when the ignition switch (IGN) is in an off-state (YES at Step S13).

Figure 3:
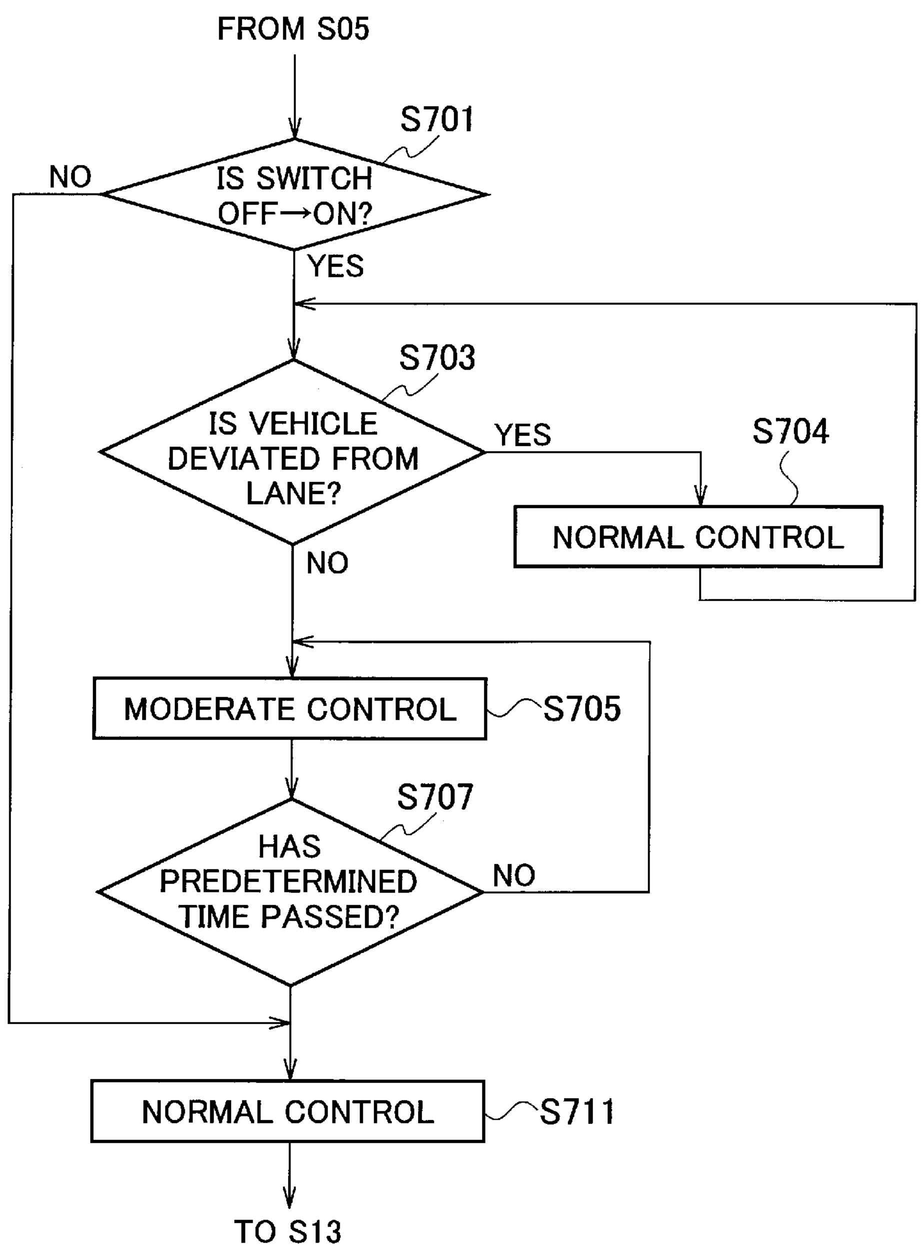
FIG. 3 is a flowchart illustrating a detailed procedure of lane keeping control (Step S07) in FIG. 2.

A detailed procedure of the lane keeping control (Step S07) in FIG. 2 is described with reference to FIG. 3.

First, at Step S701, the switch-state detection unit 110 determines whether the driving mode has been switched from the manual driving mode to the automatic driving mode through an operation of the driving-assist changeover switch 18 by the driver. When the driving mode has been switched (YES at Step S701), the process proceeds to Step S703 and the vehicle control unit 130 determines, on the basis of travel state information of the own vehicle, whether the own vehicle deviates from the lane if the travel state (an acceleration/deceleration state or a steering state) of the own vehicle is maintained. When it is determined that the own vehicle deviates from the lane (YES at Step S703), the process proceeds to Step S704 and the vehicle control unit 130 executes the lane keeping control required to prevent the own vehicle from deviating from the lane with the "normal control amount". Specifically, the vehicle control unit 130 sets the ratio (the gain value) of the actual steering torque to the target value of the steering torque to a larger value than a predetermined reference value.

When it is determined that the own vehicle does not deviate from the lane (NO at Step S703), the process proceeds to Step S705 and the vehicle control unit 130 executes the lane keeping control with the "moderate control amount" smaller than the "normal control amount". Specifically, the vehicle control unit 130 sets the ratio (the gain value) of the actual steering torque to the target value of the steering torque to a value smaller than the predetermined reference value.

At Step S707, it is determined whether a predetermined time has passed since switching from the manual driving mode to the automatic driving mode is performed and control on travel of the own vehicle is started. This enables the vehicle control unit 130 to execute the lane keeping control with the "moderate control amount" until a predetermined time passes since switching from the manual driving mode to the automatic driving mode is performed and control on travel of the own vehicle is started.

When the predetermined time has passed since switching from the manual driving mode to the automatic driving mode is performed and control on travel of the own vehicle is started (YES at Step S707), the process proceeds to Step S711 and the vehicle control unit 130 executes the lane keeping control with the "normal control amount". The process thereafter returns to Step S13 in FIG. 2.

Although the present invention has been described above by reference to the embodiment, it should not be construed that the present invention is limited to the descriptions and the drawings that constitute a part of the present disclosure. On the basis of the present disclosure, various alternative embodiments, practical examples, and operating techniques will be apparent to those skilled in the art.

Although an example in which the travel control device 100 controls steering of a vehicle as one example of travel control has been described, the present invention is not limited thereto. For example, braking force of right and left tires can be controlled independently, instead of steering of a vehicle or in addition to steering of a vehicle. For example, by application of braking force only to the right or left tire, the own vehicle can be turned to the right or the left.

Respective functions described in the above embodiment can be implemented by one processing circuit or plural processing circuits. A processing circuit includes a programmed processing device such as a processing device including an electric circuit. The processing device also includes a device such as an application specific integrated circuit (ASIC) or a conventional circuit component adapted to perform the functions described in the embodiment.

Although an example of lane keeping control to control travel of an own vehicle to locate the own vehicle at a predetermined position with respect to lane markers of a lane in which the own vehicle is traveling has been shown in the embodiment, the present invention is not limited thereto. For example, the present invention can also be applied to following control to control travel of an own vehicle to locate the own vehicle at a predetermined position with respect to a preceding vehicle traveling ahead of the own vehicle in a lane.

The entire content of Japanese Patent Application No. 2016-133219 (filed on Jul. 5, 2016) is herein incorporated by reference, which protects the present application from mistranslations and omissions.

REFERENCE SIGNS LIST

- 18 driving-assist changeover switch
- 25 steering actuator
- 100 travel control device
- 110 switch-state detection unit
- 120 lane-marker recognition unit
- 130 vehicle control unit

The invention claimed is:

1. A travel control method of a travel control device that can switch between an automatic driving mode in which travel of an own vehicle is controlled to locate a lateral position of the own vehicle at a predetermined position with respect to a lane in which the own vehicle is traveling and a manual driving mode in which travel of the own vehicle is not controlled, the method comprising:

when switching from the manual driving mode to the automatic driving mode is performed, calculating a steering-angle target value required to locate the lateral position of the own vehicle with respect to the lane at a predetermined position;

computing a target control value required to cause an actual steering angle to match the steering-angle target value;

adjusting a gain value by which the target control value is to be multiplied; to adjust an actual control amount;

determining whether the own vehicle deviates from the lane;

in response to determining that the own vehicle does not deviate from the lane, setting the gain value in a time from when switching to the automatic driving mode is performed until a predetermined time passes smaller than the gain value after the predetermined time has passed; and in response to determining that the own vehicle deviates from the lane, setting the gain value in a time from when switching to the automatic driving mode is performed until the predetermined time passes equal to the gain value after the predetermined time has passed.

2. The travel control method according to claim 1, comprising:

in response to determining that the own vehicle deviates from the lane in a time from when switching to the automatic driving mode is performed until a predetermined time passes, executing control on travel required to enable the own vehicle to keep the lane with a control amount on the travel after the predetermined time has passed; and setting a control amount on the travel after the control on travel required to enable the own vehicle to keep the lane has been executed to a control amount on the travel until the predetermined time passes.

3. A travel control device that can switch between an automatic driving mode in which travel of an own vehicle is controlled to locate a lateral position of the own vehicle at a predetermined position with respect to a lane in which the own vehicle is traveling and a manual driving mode in which travel of the own vehicle is not controlled, wherein when switching from the manual driving mode to the automatic driving mode is performed, a steering-angle target value required to locate the lateral position of the own vehicle with respect to the lane at a predetermined position is calculated, a target control value required to cause an actual steering angle to match the steering-angle target value is computed, a gain value by which the target control value is to be multiplied is adjusted to adjust an actual control amount, it is determined whether the own vehicle deviates from the lane, in response to determining that the own vehicle does not deviate from the lane, the gain value in a time from when switching to the automatic driving mode is performed until a predetermined time passes is set to be smaller than the gain value after the predetermined time has passed, and in response to determining that the own vehicle deviates from the lane, the gain value in a time from when switching to the automatic driving mode is performed until the predetermined time passes is set to be equal to the gain value after the predetermined time has passed.

* * * * *